United States Patent
Abrams

(10) Patent No.: US 7,240,299 B2
(45) Date of Patent: Jul. 3, 2007

(54) METHOD FOR IMPROVING USAGE OF A GRAPHIC USER INTERFACE POINTING DEVICE

(75) Inventor: Roger Kenneth Abrams, Raleigh, NC (US)

(73) Assignee: International Business Machines Corporation, Armonk, NY (US)

(*) Notice: Subject to any disclaimer, the term of this patent is extended or adjusted under 35 U.S.C. 154(b) by 1105 days.

(21) Appl. No.: 09/842,471

(22) Filed: Apr. 26, 2001

(65) Prior Publication Data

US 2002/0158920 A1    Oct. 31, 2002

(51) Int. Cl.
*G06F 3/00* (2006.01)

(52) U.S. Cl. .............. 715/857; 715/858; 715/856; 715/764; 345/441; 345/442; 345/157

(58) Field of Classification Search .............. 345/654, 345/474, 440.1, 440.2, 764, 857, 858, 442, 345/157, 856; 715/654, 764, 857, 858, 856
See application file for complete search history.

(56) References Cited

U.S. PATENT DOCUMENTS

| | | | | |
|---|---|---|---|---|
| 5,325,479 A | * | 6/1994 | Kaasila ...................... | 345/151 |
| 5,565,888 A | | 10/1996 | Selker ....................... | 345/146 |
| 5,598,183 A | * | 1/1997 | Robertson et al. .......... | 715/856 |
| 5,754,532 A | * | 5/1998 | Dev et al. ................... | 370/250 |
| 5,892,462 A | * | 4/1999 | Tran .......................... | 340/961 |
| 5,892,520 A | * | 4/1999 | Ioka et al. ................... | 345/474 |
| 5,896,123 A | | 4/1999 | Nagahara et al. ........... | 345/145 |
| 6,005,549 A | | 12/1999 | Forest ........................ | 345/157 |
| 6,031,531 A | | 2/2000 | Kimble ....................... | 345/348 |
| 6,097,391 A | | 8/2000 | Wilcox ....................... | 345/350 |
| 6,100,874 A | | 8/2000 | Schena et al. .............. | 345/157 |
| 6,326,986 B1 | * | 12/2001 | Alexander .................. | 345/764 |
| 6,515,689 B1 | * | 2/2003 | Terashima .................. | 345/856 |
| 6,529,210 B1 | * | 3/2003 | Rees ......................... | 345/654 |
| 6,631,303 B1 | * | 10/2003 | De Leon et al. ............. | 700/85 |
| 6,642,927 B1 | * | 11/2003 | Balakrishnan et al. ...... | 345/442 |

* cited by examiner

*Primary Examiner*—Weilun Lo
*Assistant Examiner*—Mylinh Tran
(74) *Attorney, Agent, or Firm*—Winstead Sechrest & Minick P.C.

(57) ABSTRACT

A two part method for improving the usage of a pointing device by a physically impaired user is disclosed. A first method is provided for learning how a user moves the pointing device by acquiring motion data for a user and generating motion vectors corresponding to when the user moves from source point icons to destination point icons. A second method of combining the learned user motion data with an application program where the user navigates the pointing device to select program icons on a graphical user interface (GUI) screen is provided. The method determines when the actual motion vector is similar to a previously acquired motion vector with a similar source point. The method predicts a destination point icon and highlights and locks the prediction icon until the user either actuates the iconor generates motion vectors that indicate that another destination point icon is the more likely destination.

49 Claims, 7 Drawing Sheets

METHOD FOR IMPROVING USAGE OF A GRAPHIC USER INTERFACE POINTING DEVICE

TECHNICAL FIELD

The present invention relates in general to improving the usage of pointing devices by physically impaired people.

BACKGROUND INFORMATION

Pointing devices (e.g., a mouse) are designed to enable a user of a computer system to locate and activate icons which in turn are used to activate operations within a computer system. To effectively use modem computer systems, it is essential to be able to use pointing devices. However, some users of computer systems are physically impaired for a variety of reasons which cause them to not be very adept at maneuvering various pointing devices. The operation of pointing devices is designed for the majority of users and thus their mechanical operation is not easily changed. Likewise, designing new pointing devices better suited to the physically impaired, has serious economic considerations of market size and production volumes.

Therefore, there is a need for a method of improving the usage of present pointing devices by software means to make them easier for the physically impaired to better use computer systems.

SUMMARY OF THE INVENTION

A method for improving the usage of pointing devices by the physically impaired includes two elements, a learning method and a pointing device usage method. The learning method is incorporated into routines of a learning program. The learning program presents a series of graphic user interfaces (GUI) with sets of icons to a user of a pointing device. The user is directed to predetermined sequences of source point icons (where an operation may originate) and destination point icons (the next operation begins) to navigate and actuate using a pointing device. As the user navigates the pointing device during the learning program, the pointing device indicator position and time data (motion data) are stored and analyzed to determine sets of user motion vectors (starting position, velocity and direction). The pointing device usage method is incorporated into routines of a pointing device usage program. The pointing device usage program operates in conjunction with application programs and compares a present user's motion vector, corresponding to a pointing device, with a database (database in this context means any group of acquired data) of corresponding previously acquired motion vectors to predict a most likely destination point icon. The most likely destination point icon is highlighted and locked until actuated by the user or a more likely destination point icon is predicted by successive user motion vectors. Embodiments of the present invention continue to acquire pointing device indicator motion data during the pointing device usage program to enhance the database of user motion vectors. The program continues to learn how a user positions a pointing device to improve a pointing device usage by a physically impaired user.

The foregoing has outlined rather broadly the features and technical advantages of the present invention in order that the detailed description of the invention that follows may be better understood. Additional features and advantages of the invention will be described hereinafter which form the subject of the claims of the invention.

BRIEF DESCRIPTION OF THE DRAWINGS

For a more complete understanding of the present invention, and the advantages thereof, reference is now made to the following descriptions taken in conjunction with the accompanying drawings, in which.

DETAILED DESCRIPTION

Figure 1:
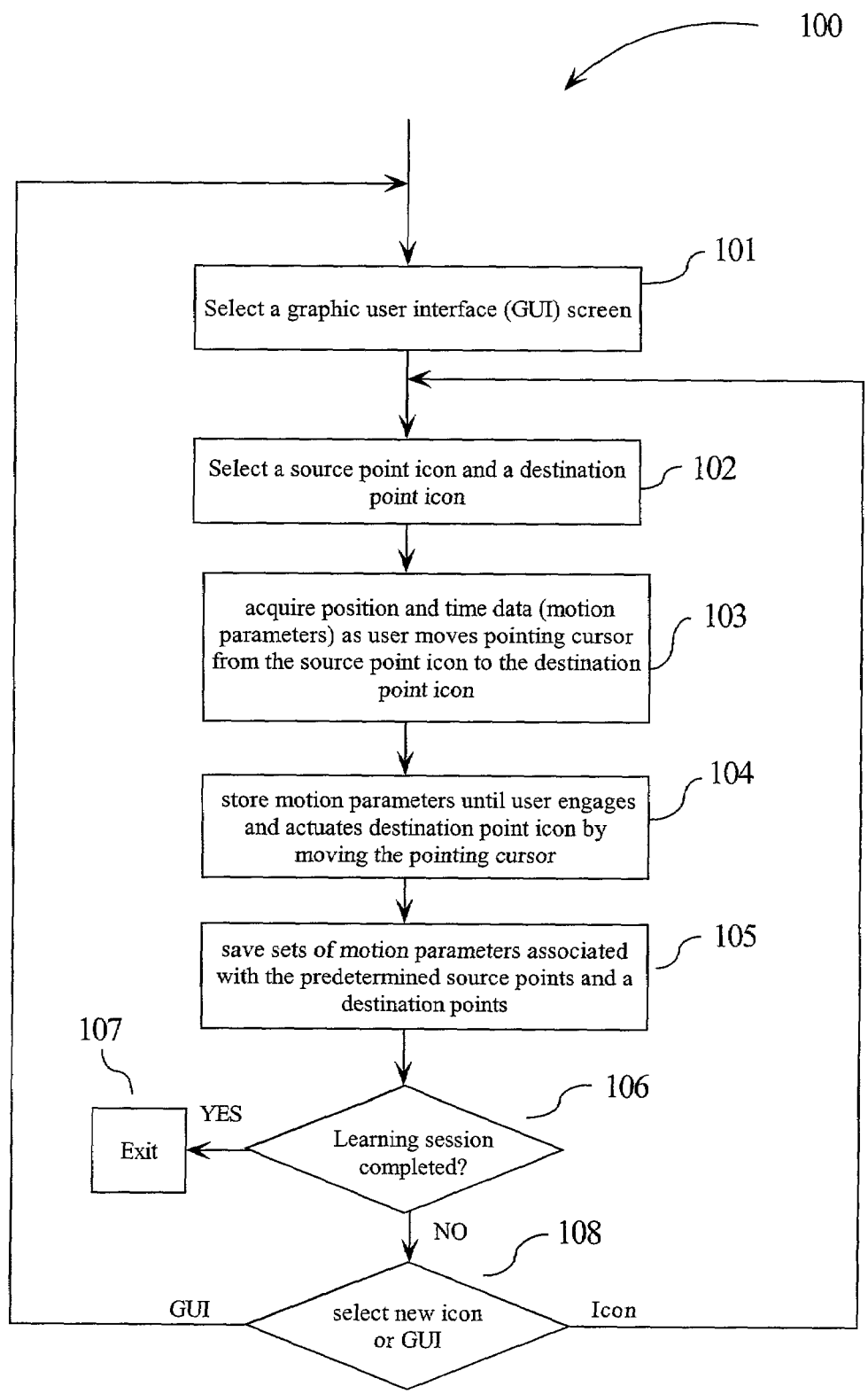
FIG. 1 is a flow diagram of method steps in one embodiment of the present invention.

In the following description, numerous specific details are set forth to provide a thorough understanding of the present invention. However, it will be obvious to those skilled in the art that the present invention may be practiced without such specific details. In other instances, well-known circuits have been shown in block diagram form in order not to obscure the present invention in unnecessary detail. For the most part, details concerning timing considerations and the like have been omitted in as much as such details are not necessary to obtain a complete understanding of the present invention and are within the skills of persons of ordinary skill in the relevant art.

Refer now to the drawings wherein depicted elements are not necessarily shown to scale and wherein like or similar elements are designated by the same reference numeral through the several views. In the following description, the terms packet and frame may be used interchangeably as a fixed block of data transmitted as a single entity.

FIG. 1 is a flow diagram of steps in a learning method 100 according to embodiments of the present invention. In one embodiment of the present invention the learning method 100 is incorporated into routines of a learning program. Referring to both FIGS. 1 and 4, in step 101, a graphic user interface (GUI) screen is selected to start a learning session for a user. In step 101, a source point icon (e.g., 425) and a destination point icon (e.g., 407) are selected for the user. The user may then position a pointing cursor(e.g., a mouse) over the source point icon 425. An ideal motion vector for moving from exemplary source point vector 425 and desti nation point vector 407 may be motion vector V11 419. If the ideal motion vector V11 419 was followed, the pointing cursor would begin at the source point icon 425 and proceed directly to destination point icon 407. A physically impaired user may, instead, follow an exemplary path illustrated by motion vectors 411, 415, 416, 417 and 418 before the pointing cursor (corresponding to moving a pointing device, e.g., 726) is in a close proximity of destination point icon 407. The meandering motion vector string 414, 415, 416, 417 and 418 are indicative of an interrupted motion that a physically impaired user may impart to the pointing device while attempting to move from source point icon 425 to destination point icon 407. During the motion from source point icon 425 to destination point icon 407, position and time data are acquired in step 103. The data acquisition continues until the user has positioned the pointing cursor to corresponding motion vector 418. At this time the pointing cursor may be close enough to destination point icon 407 to reliably indicate destination point icon 407 engagement. The learning program highlights destination point icon 407 until the user actuates it (e.g., double clicks a button on mouse 726) at which time the acquired motion vectors are stored in a database. The learning program may indicate to the user that it would be advantageous for the move from source point icon 425 to destination point icon 407 to be repeated. Motion vector generation continues until the user engages the destination point or target icon 407 in step 104. The sets of motion parameters associated with the predetermined source points and destination points are stored in step 105. In step 106, a test is done to determine if the learning session is completed. If the result of the test in step 106 is YES, then in step 107 the learning session is terminated. If the result of the test in step 106 is NO, then a test is done in step 108 to determine if a new icon set or a complete new GUI is to be selected. If a new icon set is to be selected, then a branch is executed to step 102. If a new GUI is to be selected, then a branch is executed to step 101 where a new GUI screen is selected.

Figure 2:
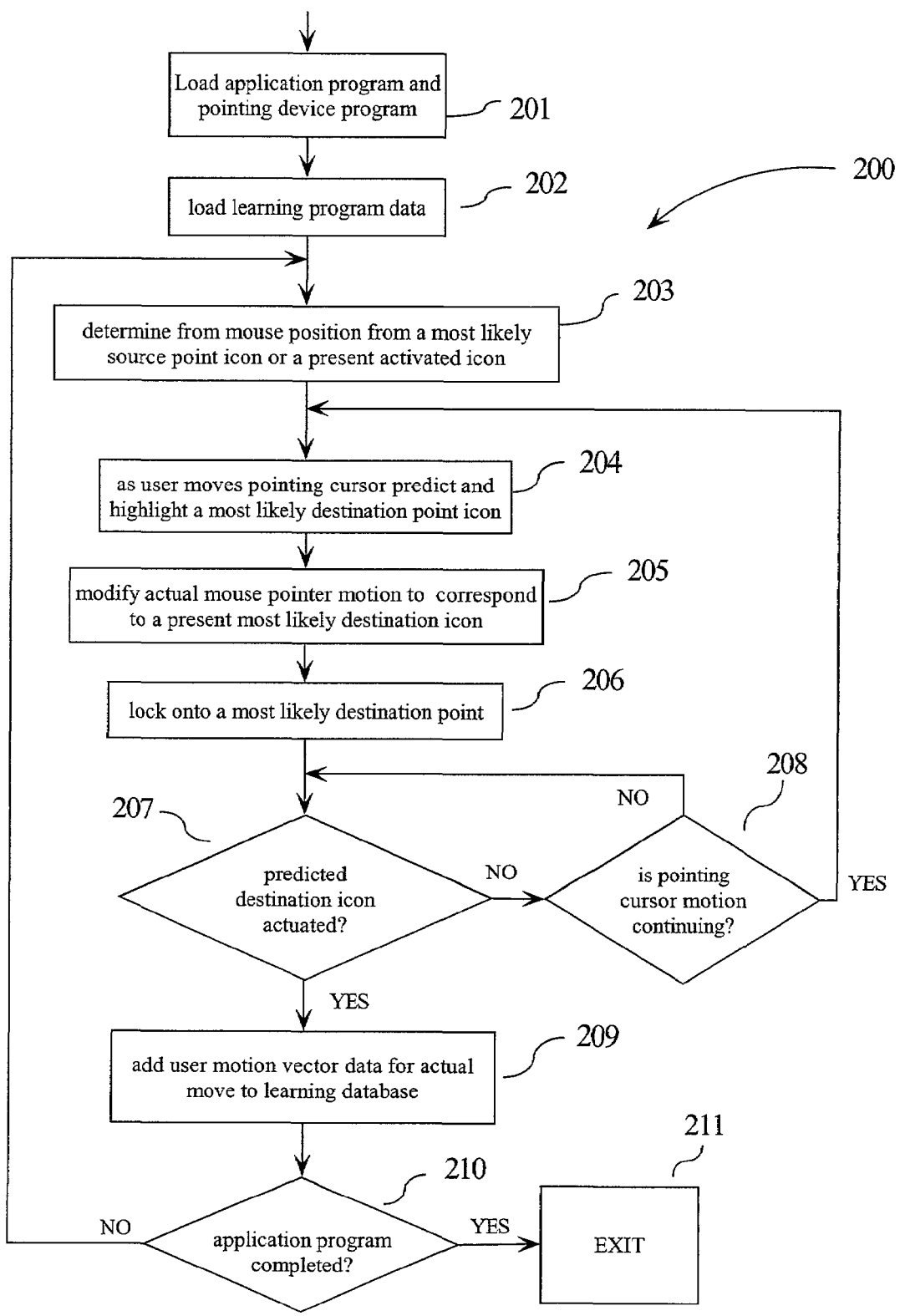
FIG. 2 is a flow diagram of method steps in another embodiment of the present invention.

FIG. 2 is a flow diagram of method steps for using embodiments of the present invention to move a pointing cursor in conjunction with an application program. The pointing device method is incorporated in routines of a pointing device program. In step 201, the pointing device program is activated. In step 202, previously acquired and processed learned data (see FIG. 1) for the present user is loaded. In step 203, the present pointing cursor position is compared to the learned data to determine motion vector sets to consider for a present move. In step 204, actual user motion vectors are compared to learned motion vectors from learned data to predict a most likely destination point icon. Since learned data has calculated motion vectors from source points with parameters which may include average velocity, source (start) points, stop points and direction, the actual motion vector may be compared to previously stored motion vectors to predict a destination point icon. If the actual motion vector allows a prediction to be made, then the predicted destination icon is highlighted. At this time the user may actuate the icon if it is correct or they may continue to move the pointing device. In step 205, the pointing cursor motion is modified to follow a predicted path or a path between possible paths rather than the particular path that the user may be causing the pointing cursor to follow. In this way, the user may see a smoother pointing cursor motion. If the user sees that the predicted path is not their desired path, they may modify their actual pointing cursor direction. In step 206, a most likely destination icon is highlighted and locked. In step 207, a test is made to determine if the predicted destination icon is actuated. If the result of the test in step 207 is NO, then a test is done in step 208 to determine if the pointing cursor is moving (coordinates changing). If the result of the test in step 208 is NO, then step 207 is repeated until the result of the test in step 207 or 208 is YES. If the result of the test in step 208 is YES, then step 204 is repeated where alternate destination point icons are predicted. If the result of the test in step 207 is YES, then the user has actuated the predicted destination icon. In step 209, the motion vector data for the actual move may be added to the user learning database. In step 210, a test is done to determine if the application program is completed. If the result of the test in step 210 is YES, then the program is ended in step 211. If the result of the test in step 210 is NO, then a branch is executed back to step 203 when the application program may be continued.

Figure 3:
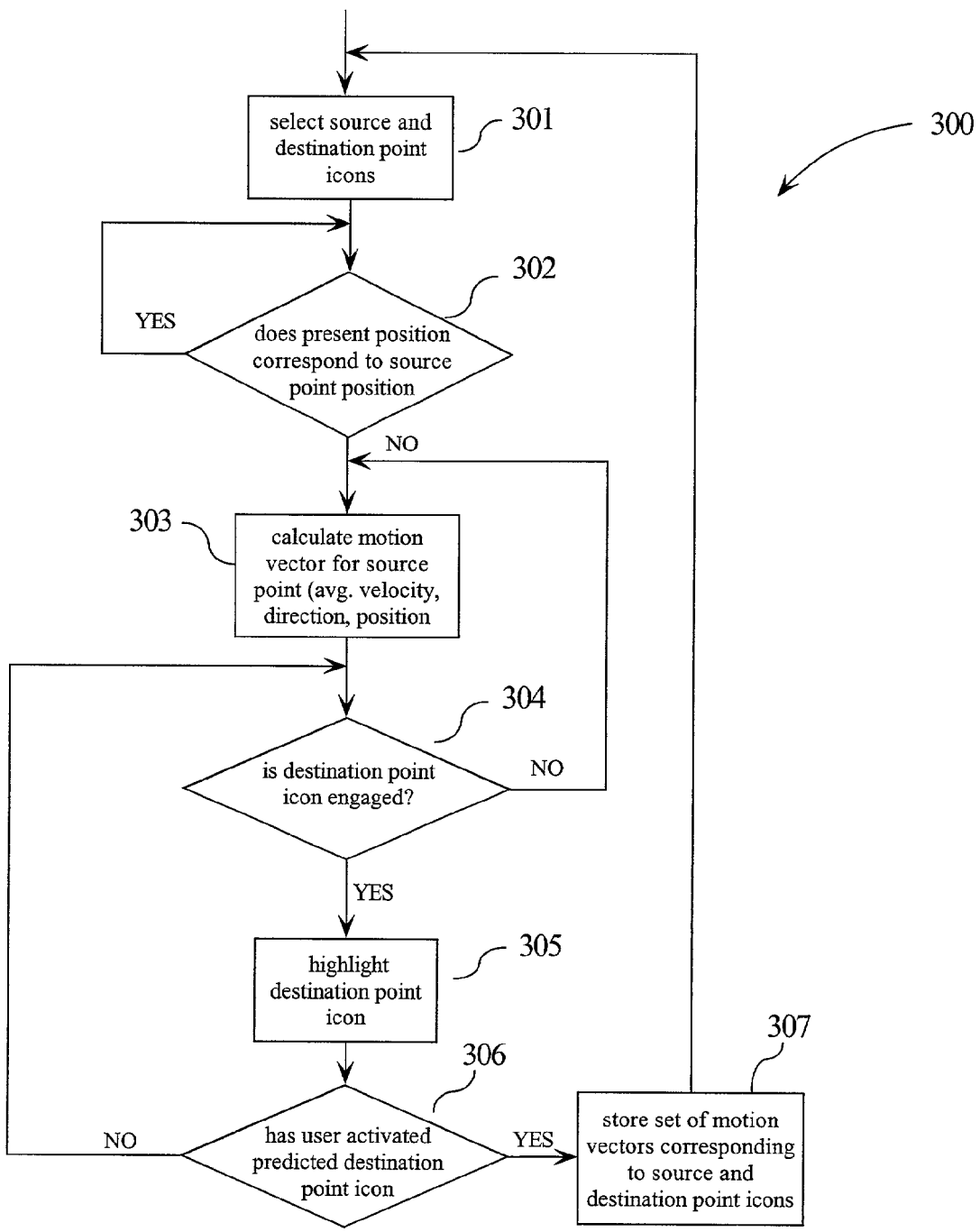
FIG. 3 is a flow diagram of method steps in an embodiment of the present invention.
Figure 4:
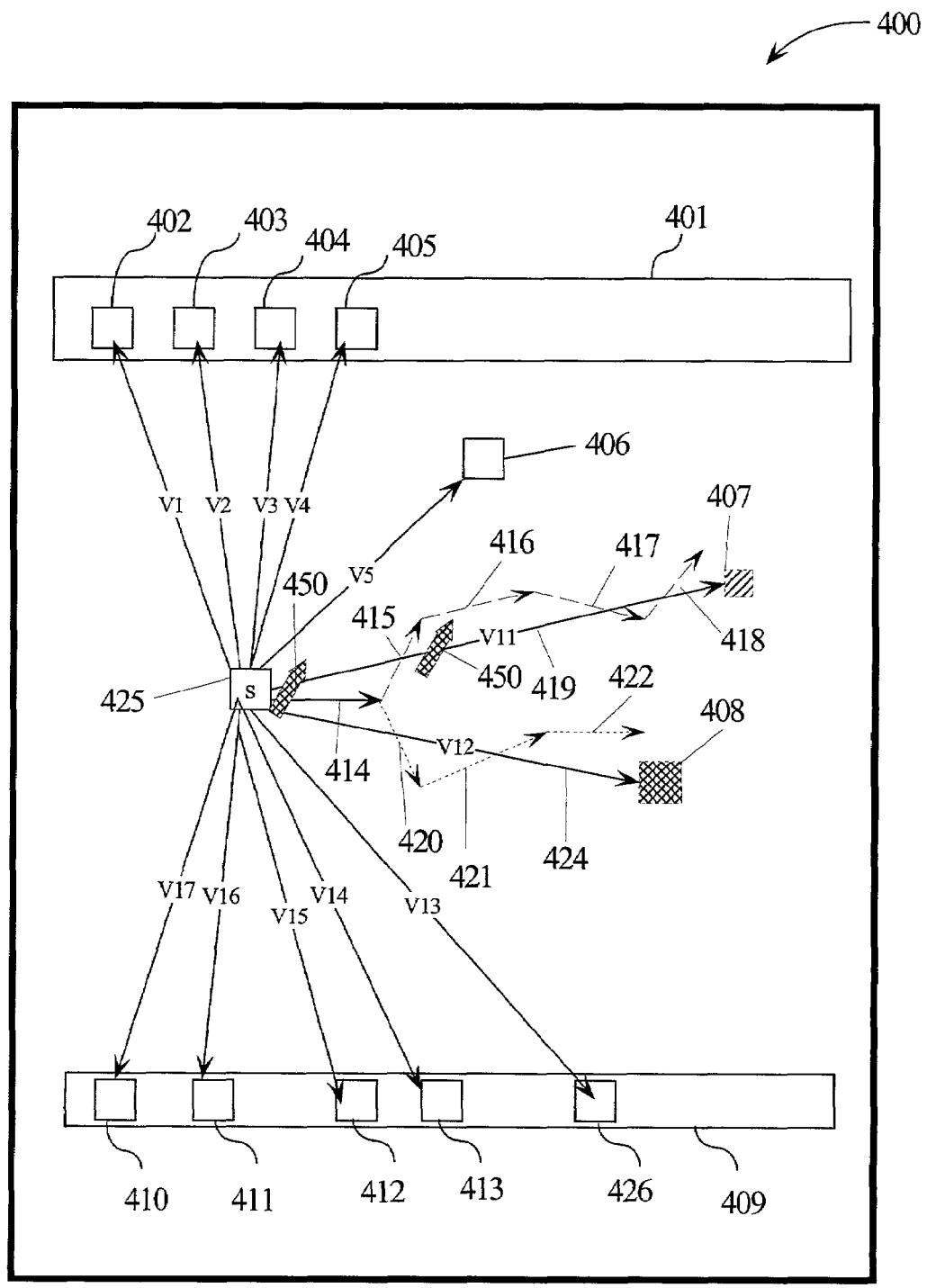
FIG. 4 is a diagram of an exemplary graphic user interface (GUI) screen illustrating motion vectors from a source point icon to various destination point icons according to one embodiment of the present invention.

FIG. 3 is a flow diagram of method steps used in embodiments of the present invention during a learning portion of the present invention. Assume the exemplary GUI screen 400 in FIG. 4 is being displayed to a user during a learning session (e.g., via display 739 in FIG. 7). A user may select any of the presented icons displayed on the GUI screen 400 as a source point icon, for example, source point icon 425 may be selected. Since a user may not have good control with a pointing device 726, a source point icon 425 may be selected using positioning arrows that are found on most computer keyboards (e.g., 724). Once a source and a destination point icon have been selected in step 301, either automatically by the learning program or by the user, the actual data collection begins. In step 302, a test is done to determine if the present pointing cursor position is the same as the source point icon. If the result of the test in step 302 is YES, then the pointing cursor is not moving and a branch back to step 302 is executed awaiting pointing cursor movement resulting from movement of a pointing device (e.g., 726 or 732). If the result of the test in step 302 is NO, then a motion vector is calculated in step 303 for the source point icon. Since motion vectors may include a magnitude parameter (e.g., velocity), a start position, a stop position, and a direction, the first motion vector start position corresponds to the position of the source point icon of step 301. In step 304, a test is done to determine if the destination point icon has been engaged. Since the destination point icon is known (selected in step 301), engagement may be defined as the user getting the pointing cursor within a certain predetermined proximity of the destination point icon. If the result of the test in step 304 is NO, then additional motion vectors are calculated in step 303 (as motion continues). If the result of the test in step 304 is YES, then the destination point icon is highlighted in step 305. In step 306, a test is done to determine if the user has actuated the destination point icon. If the result of the test in step 306 is NO, then the user may have moved the pointing device outside of the lock range or has not yet actuated the icon (e.g., double clicking a button on mouse 726). In this case, steps 303 and 304 are repeated. If the result of the test in step 304 is YES, then the motion vectors acquired corresponding to the source and destination point icons are stored in step 307. After step 307, step 301 is repeated where the same or a different source and destination point icons may be selected. If the same source and destination point icons are again chosen in step 301 then the data for repeated runs may be averaged for a user moving the pointing cursor from the particular source point to the particular destination point icons to achieve better prediction data.

FIG. 4 illustrates an exemplary GUI screen 400 that may be used to learn user pointing device movements when acquiring data according to embodiments of the present invention. Toolbar 401 includes various identified icons (e.g., 402–405). Likewise, toolbar 409 includes identified icons 410–413 and 426. Vectors V1–V5 and V11–V17 illustrate ideal paths that a pointing cursor may take from a source point icon 425 to various destination point icons 402–408, 410–413 and 426. Particular destination point icons 407 and 408 are used to illustrate paths a physically impaired user of a pointing device may generate when attempting to move a pointing cursor from source point icon 425. A user may exit from source point icon 425 with an initial motion vector 414 and precede with motion vectors 415, 416, 417 and 418. Once motion vector 418 has been generated, destination point icon 407 may be close enough for pointing cursor 450 to enable the learning program to highlight the destination point icon 407. At this point, the user may actuate destination point icon 407 in which case motion vectors 414, 415, 416, 417, and 418 would be saved as associated with source point icon 425 and destination point icon 407. If source point icon 425 was again selected with destination point icon 408, then corresponding motion vectors 414, 420, 421, and 422 may be acquired as the user moves from source point icon 425 to destination point icon 408. Again these motion vectors would be saved in the event destination point icon 408 was actuated.

Figure 6:
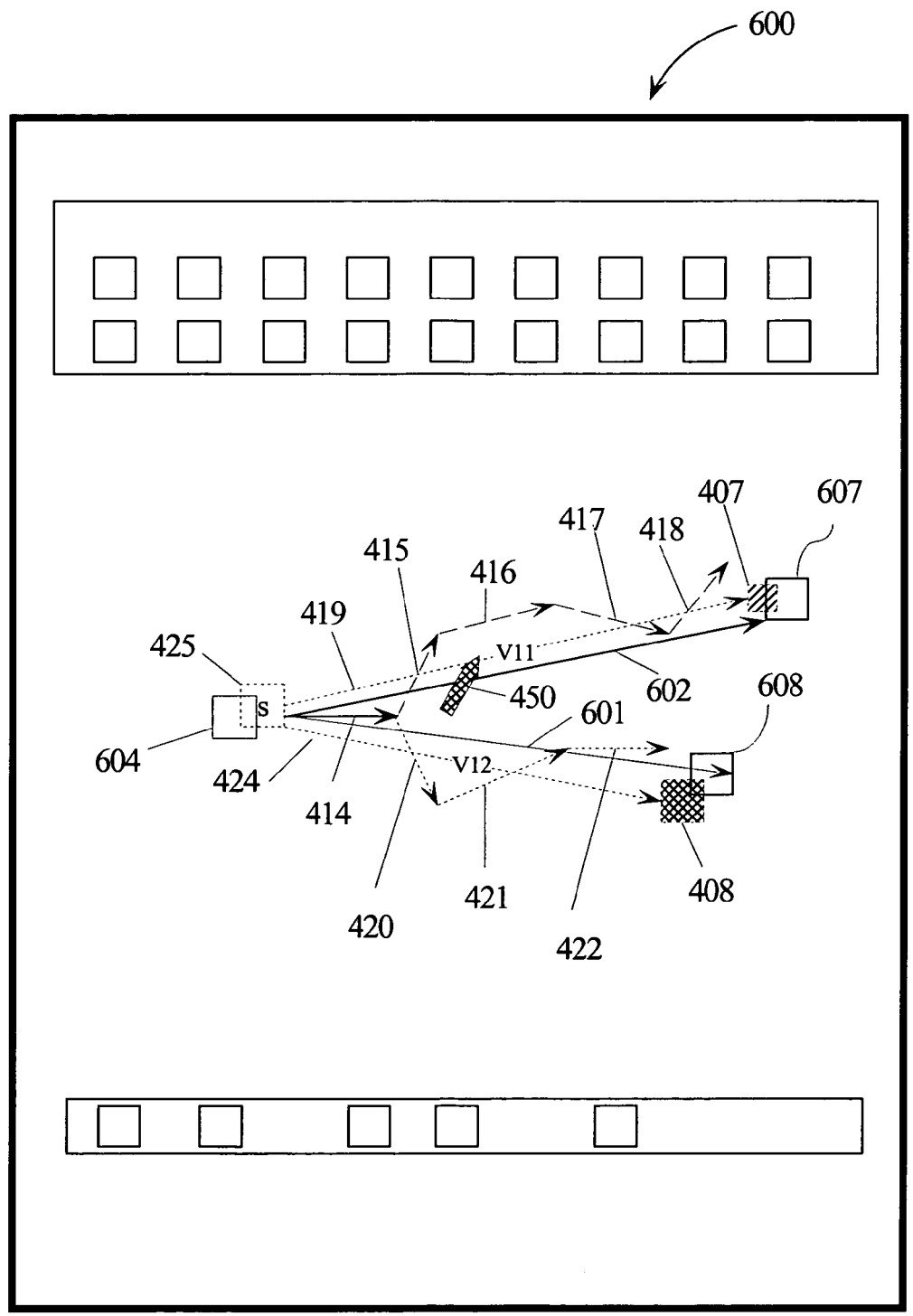
FIG. 6 is another diagram of exemplary graphic user interface (GUI) screen illustrating motion vectors from multiple source point icons to various destination point icons according to an embodiment of the present invention.

FIG. 6 illustrates an exemplary application program GUI screen 600 on a display (e.g., 739) presented to the user that acquired data from exemplary GUI screen 400. An exemplary application program (refer to FIG. 2 step 201) in is run in combination with a pointing device program (refer to FIG. 2 steps 202–209) according to embodiments of the present invention. GUI screen 600 has exemplary source point icon 604 and icons 607 and 608 which are presented as destination point icons. In this example, the user desires to move from source point icon 604 first to destination point icon 607. Once the user begins at source point icon 604, the pointing device program determines that source point data, acquired for a source point icon 425, may be similar to that which may be generated for source point icon 604. For example, if the user generates a motion vector similar to motion vector 414, then the program may predict, as a destination, either destination point icon 607 or destination point icon 608. If previous acquired data by the learning method 100 suggests that a starting motion vector similar to 414 had previously ended at destination icons in the region of icons 607 or 608 (e.g., 407 and 408), then a prediction of a destination may not yet be clear. However, if the user proceeds next with a motion vector more associated with motion vector 415 than 420, then path 602 to destination point icon 607 may seem more likely. Once a motion vector more similar to 415 follows one similar to 414, then embodiments of the present invention may highlight icon 607 as a predicted destination point icon and modify the motion of the pointing cursor 450 to more closely follow path 602 toward destination icon 607. While the actual motion of the pointing cursor 450, generated by the user's movement of the pointing device (e.g., 726), may more closely follow motion vectors 414, 415, 416, 417 and 418, the user would see the pointing device motion indication (pointing cursor 450) on the screen (e.g., 739) follow a motion vector more similar to 602. Likewise, if after generation of a motion vector similar to motion vector 414 the motion of the pointing cursor 450 more closely followed a motion vector 420, then the pointing device program may indicate that destination point icon 608 was the most likely destination point icon. In this case, if the motion of the pointing cursor more closely followed motion vectors 420, 421 and 422, then the pointing device program would generate a pointing device motion indication on the screen that follows a motion vector more similar to motion vector 601. The goal of the learning program, according to embodiments of the present invention, is to generate a sufficient database of motion vectors that a physically impaired user would see a marked improvement in their ability to select icons. During the time an application is executed, combined with a pointing device program according to embodiments of the present invention, additional data may be acquired to further improve a particular user database of motion vectors for source point to destination point icon predictions.

Figure 5:
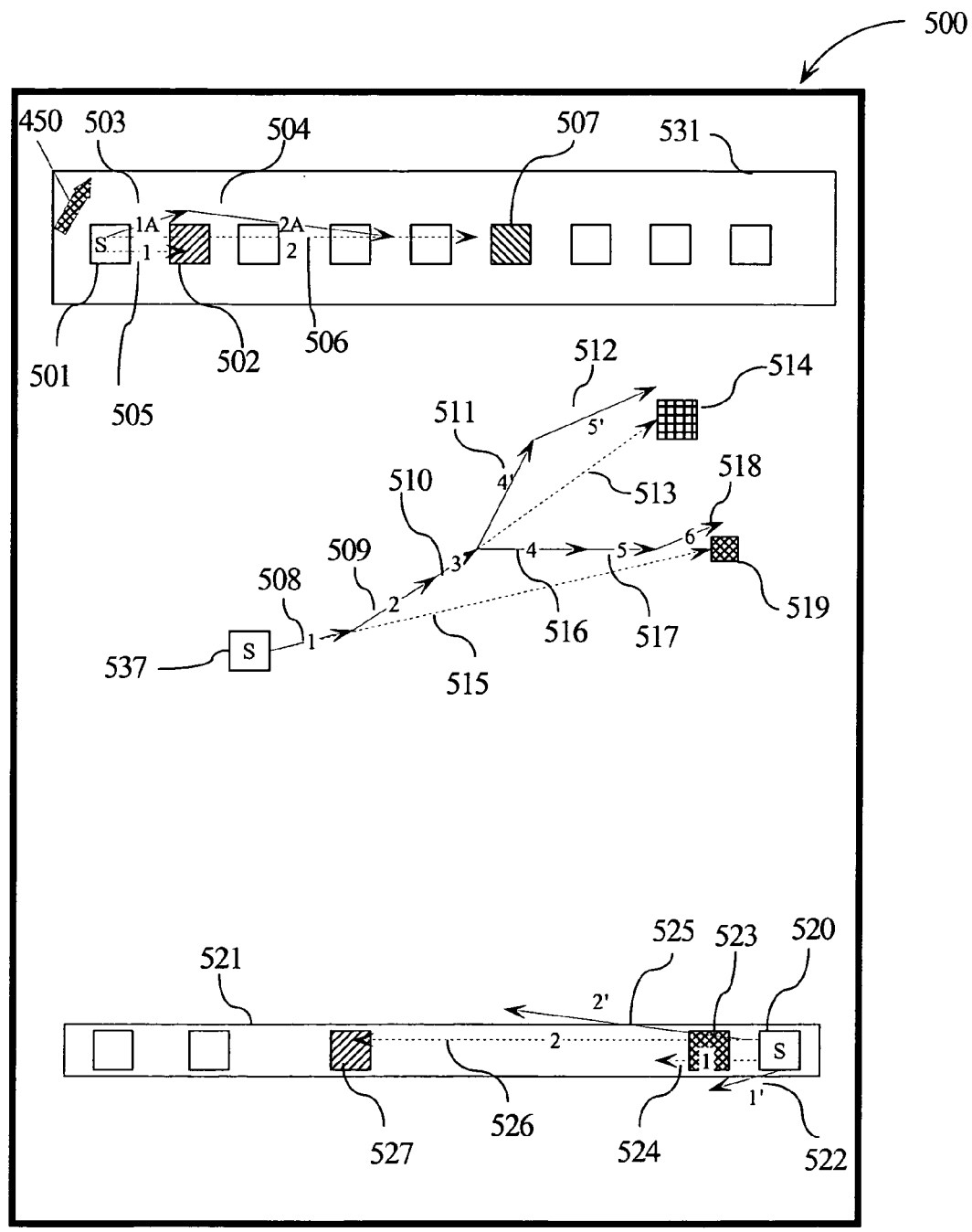
FIG. 5 is a diagram of an exemplary graphic user interface (GUI) screen illustrating motion vectors from multiple source point icons to various destination point icons according to an embodiment of the present invention.

FIG. 5 is another illustration of an exemplary GUI screen 500 used to acquire motion vector data for a physically impaired user. Tool bar 531 has a source point icon 501 and two identified destination point icons 502 and 507. Embodiments of the present invention recognize that tool bars may have icons arranged in rows and that icon selection, for example, while a pointing cursor 450 is in the tool bar 531, would normally proceed left, right or up and down. Exemplary tool bar 531 has icons arranged in a row (e.g., 501, 502 and 507). If a user started at source point icon 501, a normal motion vector from source point icon 501 to destination point icon 502 may be motion vector 505. A normal motion vector from source point icon 501 to destination point icon 507 may be motion vector 506. A physically impaired user may generate more indirect motion vectors, illustrated by motion vectors 503 and 504, when moving from source point icon 501 to either destination point icon 502 or 507. If a user started from source point icon 501 with motion vector 503, then embodiments of the present invention may predict that destination point icon 502 was the destination based on previously stored motion vector data acquired in the learning method 100. If a succeeding motion vector 504 was generated by the user before an icon actuation (e.g., a user double clicks a button of mouse 726), then a pointing device program, using embodiments of the present invention, may change the destination point icon prediction to icon 507. If the pointing device program determines that the user is selecting icons within a tool bar 531, then the prediction algorithm may be modified to favor icons in direct left, right, up or down positions relative to a particular source point icon (e.g., 501). Embodiments of the present invention may break the motion generated by a physically impaired user into distinct motion vectors by detecting that the coordinates of the pointing cursor 450 do not change smoothly but rather have periods of no change during an icon selection. The detection of no change in the position coordinates of pointing cursor 450 may indicate that a predicted destination point icon may be selected (engaged) or it may indicate that the movement of the pointing device is not smooth.

Source point icon 537 in FIG. 5 is used to illustrate selecting possible destination point icons 514 and 519. In this example, a set of motion vectors 508, 509 and 510 may be associated in common with both destination point icons 514 and 519. If a physically impaired user were moving a pointing cursor 450 from source point icon 507, generating motion vectors similar to motion vectors 508, 509 and 510, then a destination point icon prediction may not be clear until motion vectors similar to 511 and 512 or 516, 517 and 518 further indicate a definite preference for either destination point icon 514 or 519. In this case, the pointing device indication that the user sees on a GUI screen 500 may show a motion vector path between ideal motion vectors 513 and 515.

Tool bar 521 illustrates another example of movement from a source point icon 520 toward identified destination point icons 524 and 527. A generated motion vector 522 may indicate that a user meant to follow an ideal motion vector 524 to destination point icon 523 while a motion vector 525 may indicate a desire to follow an ideal motion vector 526 to destination point icon 527.

Figure 7:
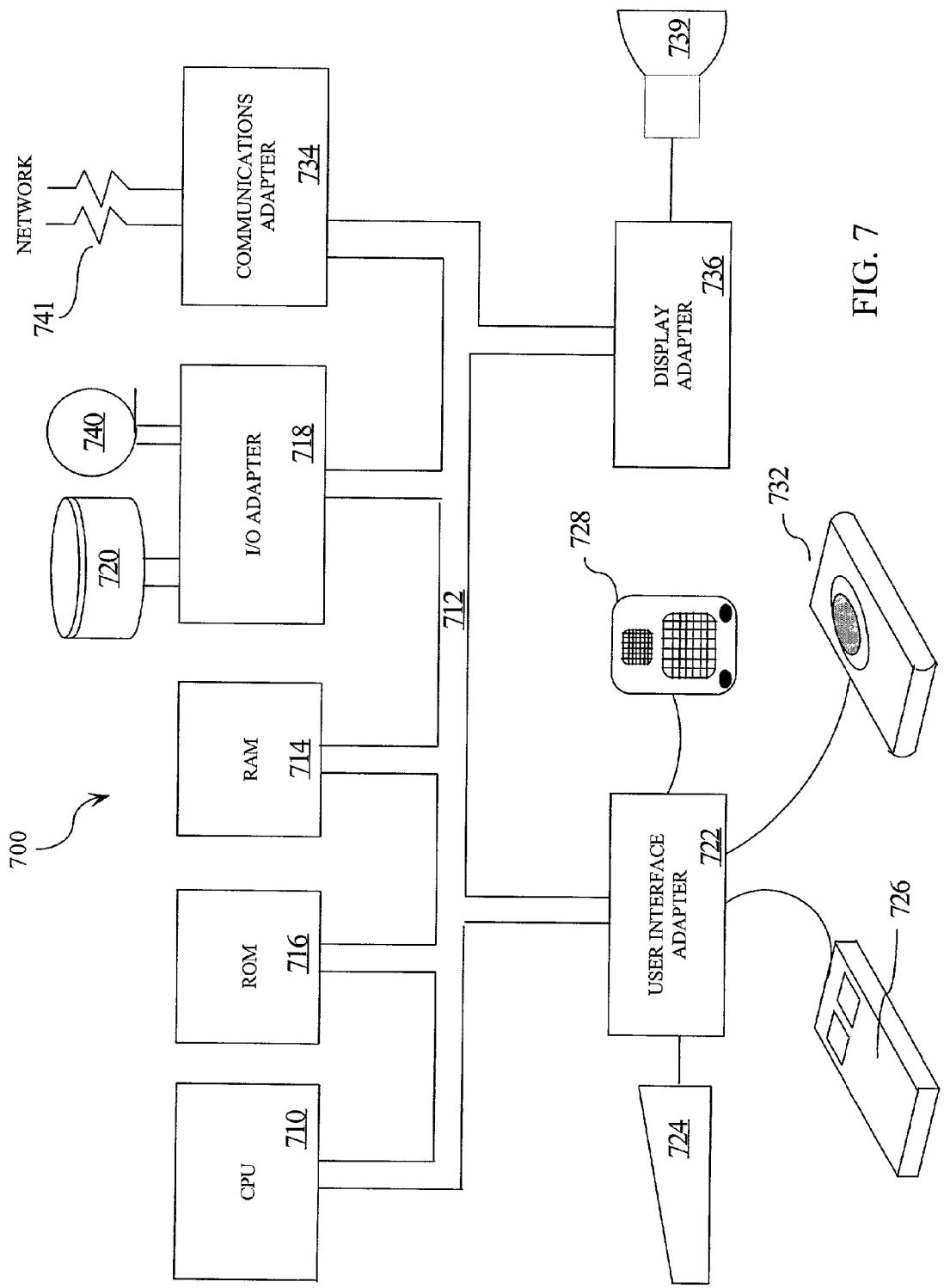
FIG. 7 is a block diagram of a computer system which is usable with embodiments of the present invention to acquire user pointing device data or run application programs using embodiments of the present invention.

FIG. 7 is a high level functional block diagram of a representative data processing system 700 suitable for practicing principles of the present invention. Data processing system 700, includes a central processing system (CPU) 710 operating in conjunction with a system bus 712. System bus 712 operates in accordance with a standard bus protocol compatible with CPU 710. CPU 710 operates in conjunction with read-only memory (ROM) 716 and random access memory (RAM) 714. Among other things, ROM 716 supports the Basic Input Output System (BIOS). RAM 714 includes DRAM (Dynamic Random Access Memory) system memory and SRAM (Static Random Access Memory) external cache. I/O Adapter 718 allows for an interconnection between the devices on system bus 712 and external peripherals, such as mass storage devices (e.g., a hard drive 720, floppy drive or CD-ROM drive), or a printer 740. A peripheral device 720 is, for example, coupled to a peripheral control interface (PCI) bus, and I/O adapter 718 therefore may be a PCI bus bridge. User interface adapter 722 couples various user input devices, such as a keyboard 724, mouse 726, track ball 732 or speaker 728 to the processing devices on bus 712. The pointing cursors of mouse 726 and track ball 732 may be modified using embodiments of the present invention. Display adapter 736 supports a display 739 may display graphic user interface (GUI) screens, pointing cursors, and source and destination point icons, according to embodiments of the present invention. Display 739 may be, for example, a cathode ray tube (CRT), liquid crystal display (LCD) or similar conventional display units. Display adapter 736 may include among other things a conventional display controller and frame buffer memory. Data processing system 700 may be selectively coupled to a computer or communications network 741 through communications adapter 734. Communications adapter 734 may include, for example, a modem for connection to a telecom network and/or hardware and software for connecting to a computer network such as a local area network (LAN) or a wide area network (WAN). CPU 710 may be a processor system which executes a program product that works with application programs to improve a physically impaired user's operation of a pointing device according to embodiments of the present invention. CPU 710 may also be operable to execute a program product for acquiring motion vector data using method steps according to embodiments of the present invention.

Implementations of the invention include implementations as a computer system programmed to execute the method or methods described herein, and as a computer program product. According to the computer system implementation, sets of instructions for executing the method or methods may be resident in the random access memory 714 of one or more computer systems configured generally as described above. Until required by the computer system, the set of instructions may be stored as a computer program product in another computer memory, for example, in disk drive 720 (which may include a removable memory such as an optical disk or floppy disk for eventual use in the disk drive 720). Further, the computer program product can also be stored at another computer and transmitted when desired to the user's work station by a network or by an external network such as the Internet. One skilled in the art would appreciate that the physical storage of the sets of instructions physically changes the medium upon which it is stored so that the medium carries computer readable information. The change may be electrical, magnetic, chemical, biological, or some other physical change. While it is convenient to describe the invention in terms of instructions, symbols, characters, or the like, the reader should remember that all of these and similar terms should be associated with the appropriate physical elements.

Note that the invention may describe terms such as comparing, validating, selecting, identifying, or other terms that could be associated with a human operator. However, for at least a number of the operations described herein which form part of at least one of the embodiments, no action by a human operator is desirable. The operations described are, in large part, machine operations processing electrical signals to generate other electrical signals.

Although the present invention and its advantages have been described in detail, it should be understood that various changes, substitutions and alterations can be made herein without departing from the spirit and scope of the invention as defined by the appended claims.

What is claimed is:

1. A method for improving a selection of a graphic user interface (GUI) icon with a pointing device, comprising the steps of:
   acquiring data corresponding to a motion of a pointing cursor on a display, said motion of said pointing cursor corresponding to a pointing device used to move said pointing cursor from a first source position to a first destination position on said display;
   generating a set of motion vectors corresponding to said motion of said pointing cursor from said first source position to said first destination position; and
   storing said set of motion vectors and said first destination position referenced to said first source position.

2. The method of claim 1 further comprising the steps of:
   (a) generating, within an application program, a first motion vector for said pointing cursor on said display as said pointing cursor moves from a second source position in response to a motion of said pointing device;
   (b) predicting a destination point icon in response to a compare of said second source position to a corresponding stored source position or a source position proximate to said second source position, wherein said corresponding stored source position which compares to said second source position also has stored said first motion vector or a motion vector proximate to said first motion vector; and
   (c) highlighting said destination point icon.

3. The method of claim 2, further comprising the step of:
   repeating said steps (a) through (c) until said highlighted destination point icon is actuated by a user of said pointing device.

4. The method of claim 2, wherein said set of motion vectors are stored in response to actuating said destination point icon.

5. The method of claim 2, wherein said second source position corresponds to a position of a source point icon.

6. The method of claim 2, wherein said pointing cursor locks to said destination point icon until said destination point icon is actuated by a user.

7. The method of claim 2, wherein said pointing cursor locks to said destination point icon until a motion vector indicates a more likely destination point icon.

8. The method of claim 3, wherein said motion of said pointing cursor proceeds from said first source position to said destination point icon corresponding to an ideal motion vector, said ideal motion vector motion changed only if a new destination point icon is determined.

9. The method of claim 1, further comprising the steps of:
(a) generating, within an application program, a first motion vector for said pointing cursor on said display as said pointing cursor moves from a second source position in response to a motion of said pointing device;
(b) predicting a destination point icon in response to a compare of said second source position to a corresponding stored source position or a source position proximate to said second source position, wherein said corresponding stored source position which compares to said second source position also has stored said first motion vector or a motion vector proximate to said first motion vector; and
(c) modifying a motion of said pointing cursor to more nearly follow ideal motion vectors from said first source position to said destination point icon.

10. The method of claim 9, further comprising the step of:
repeating said steps (a) through (c) until said predicted destination point icon is actuated by a user of said pointing device.

11. The method of claim 1, wherein said display corresponds to a graphic user interface (GUI).

12. The method of claim 1, wherein said first source position is a position of a predetermined source point icon.

13. The method of claim 1, wherein said first destination position is a position of a predetermined destination point icon.

14. The method of claim 1, wherein another of said motion vectors is generated each time said motion starts from a motion stop.

15. The method of claim 1, wherein said motion vector comprises parameters defining a pointing cursor average velocity, starting position, stopping position, and motion direction.

16. The method of claim 1, wherein said set of motion vectors are associated with said first source position and source positions proximate to said first source position, and said first destination position and destination positions proximate to said first destination position.

17. A computer program product, said computer program product embodied in a machine readable medium, including programming for a processor, said computer program comprising a program of instructions for performing the program steps of:
acquiring data corresponding to a motion of a pointing cursor on a display, said motion of said pointing cursor corresponding to a pointing device used to move said pointing cursor from a first source position to a first destination position on said display;
generating a set of motion vectors corresponding to said motion of said pointing cursor from said first source position to said first destination position; and
storing said set of motion vectors and said first destination position referenced to said first source position.

18. The computer program product of claim 17 further comprising the steps of:
(a) generating, within an application program, a first motion vector for said pointing cursor on said display as said pointing cursor moves from a second source position in response to a motion of said pointing device;
(b) predicting a destination point icon in response to a compare of said second source position to a corresponding stored source position or a source position proximate to said second source position, wherein said corresponding stored source position which compares to said second source position also has stored said first motion vector or a motion vector proximate to said first motion vector; and
(c) highlighting said destination point icon.

19. The computer program product of claim 18, further comprising the step of:
repeating said steps (a) through (c) until said highlighted destination point icon is actuated by a user of said pointing device.

20. The computer program product of claim 18, wherein said set of motion vectors are stored in response to actuating said predetermined destination point icon.

21. The computer program product of claim 18, wherein said second source position corresponds to a position of a source point icon.

22. The computer program product of claim 18, wherein said pointing cursor locks to said destination point icon until said destination point icon is actuated by a user.

23. The computer program product of claim 18, wherein said pointing cursor locks to said destination point icon until a motion vector indicates a more likely destination point icon.

24. The computer program product of claim 19, wherein said motion of said pointing cursor proceeds from said first source position to said destination point icon corresponding to an ideal motion vector, said ideal motion vector motion changed only if a new destination point icon is determined.

25. The computer program product of claim 17, further comprising the steps of:
(a) generating, within an application program, a first motion vector for said pointing cursor on said display as said pointing cursor moves from a second source position in response to a motion of said pointing device;
(b) predicting a destination point icon in response to a compare of said second source position to a corresponding stored source position or a source position proximate to said second source position, wherein said corresponding stored source position which compares to said second source position also has stored said first motion vector or a motion vector proximate to said first motion vector; and
(c) modifying a motion of said pointing cursor to more nearly follow ideal motion vectors from said first source position to said destination point icon.

26. The computer program product of claim 25, further comprising the step of:
repeating said steps (a) through (c) until said predicted destination point icon is actuated by a user of said pointing device.

27. The computer program product of claim 17, wherein said display corresponds to a graphic user interface (GUI).

28. The computer program product of claim 17, wherein said first source position is a position of a predetermined source point icon.

29. The computer program product of claim 17, wherein said first destination position is a position of a predetermined destination point icon.

30. The computer program product of claim 17, wherein another of said motion vectors is generated each time said motion starts from a motion stop.

31. The computer program product of claim 17, wherein said motion vector comprises parameters defining a pointing cursor average velocity, starting position, stopping position, and motion direction.

32. The computer program product of claim 17, wherein said set of motion vectors are associated with said first source position and source positions proximate to said first source position, and said first destination position and destination positions proximate to said first destination position.

33. A data processing system comprising:
a central processing unit (CPU);
a random access memory (RAM);
a communications adapter coupled to a communication network;
an I/O adapter
a bus system coupling said CPU to said PROM, said communications adapter, said I/O adapter, and said RAM, wherein said CPU comprises:
circuitry for acquiring data corresponding to a motion of a pointing cursor on a display, said pointing cursor corresponding to a pointing device used to move said pointing cursor from a first source position to a first destination position on said display;
circuitry for generating a set of motion vectors corresponding to said motion of said pointing cursor from said first source position to said first destination position, said motion vectors having a vector source point, a magnitude and direction; and
circuitry for storing said set of motion vectors and said first destination position referenced to said first source position.

34. The data processing system of claim 33, further comprising:
circuitry for generating, within an application program, a first motion vector for said pointing cursor on said display as said pointing cursor moves from a second source position in response to a motion of said pointing device;
circuitry for predicting a destination point icon in response to a compare of said second source position with a corresponding stored source position or a stored proximate source position having a stored corresponding said first motion vector or a proximate motion vector; and
circuitry for highlighting said destination point icon.

35. The data processing system of claim 34, wherein said set of motion vectors are stored in response to actuating said destination point icon.

36. The data processing system of claim 34, wherein said second source position corresponds to a position of a source point icon.

37. The data processing system of claim 34, wherein said pointing cursor locks to said destination point icon until said destination point icon is actuated by a user.

38. The data processing system of claim 34, wherein said pointing cursor locks to said destination point icon until a motion vector indicates a more likely destination point icon.

39. The data processing system of claim 33, further comprising:
circuitry for generating, within an application program, a first motion vector for said pointing cursor on said display as said pointing cursor moves from a second source position in response to a motion of said pointing device;
circuitry for predicting a destination point icon in response to a compare of said second source position with a corresponding stored source position or a stored proximate source position having a stored corresponding said first motion vector or a proximate motion vector; and
circuitry for modifying a motion of said pointing cursor to follow ideal motion vectors from said first source position to said destination point icon.

40. The data processing system of claim 39, wherein said motion of said pointing device proceeds from said first source position to said destination point icon corresponding to an ideal motion vector, said ideal motion vector motion changed only if a new destination point icon is determined.

41. The data processing system of claim 33, wherein said display corresponds to a graphic user interface (GUI).

42. The data processing system of claim 33, wherein said first source position is a position of a predetermined source point icon.

43. The data processing system of claim 33, wherein said first destination position is a position of a predetermined destination point icon.

44. The data processing system of claim 33, wherein another of said motion vectors is generated each time said motion starts from a motion stop.

45. The data processing system of claim 33, wherein said motion vector comprises parameters defining a pointing cursor average velocity, starting position, stopping position, and motion direction.

46. The data processing system of claim 33, wherein said set of motion vectors are associated with said first source position and source positions proximate to said first source position, and said first destination position and destination positions proximate to said first destination position.

47. A method for improving a selection of a graphic user interface (GUI) icon with a pointing device, comprising the step of:
predicting, within an application program, a destination point icon by comparing a motion vector imparted by a user to a pointing cursor to a previously acquired motion vector imparted by a user to a pointing cursor to a previously
highlighting said destination point icon in response to said prediction step until said predicted destination point icon is actuated by said user.

48. A computer program product, said computer program product embodied in a machine readable medium, including programming for a processor, said computer program comprising a program of instructions for performing the program step of:
predicting, within an application program, a destination point icon by comparing a motion vector imparted by a user to a pointing cursor to a previously acquired motion vector acquired from said user moving said pointing cursor;
highlighting said destination point icon in response to said prediction step until said predicted destination point icon is actuated by said user.

49. A data processing system comprising:
a central processing unit (CPU);
a random access memory (RAM);
a communications adapter coupled to a communication network;
an I/O adapter;
a bus system coupling said CPU to said PROM, said communications adapter, said I/O adapter, and said RAM, wherein said CPU comprises:

circuitry operable to predict, within an application program, a destination point icon by comparing a motion vector imparted by a user to a pointing cursor to a previously acquired motion vector acquired from said user moving said pointing cursor;

circuitry operable to highlight said predicted destination point icon until said predicted destination point icon is actuated by said user.

* * * * *